Figure 3:
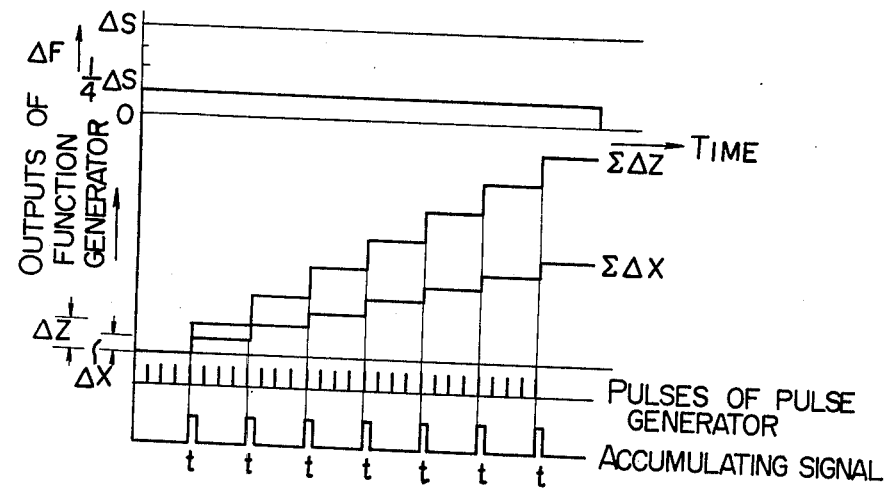

United States Patent

Kimura et al.

[11] 4,020,331
[45] Apr. 26, 1977

[54] FEED RATE CONTROL SYSTEM FOR NUMERICAL CONTROL MACHINE TOOL

[75] Inventors: Toshihiro Kimura, Nagoya; Yasumasa Narikiyo, Aichi, both of Japan

[73] Assignee: Okuma Machinery Works Ltd., Nagoya, Japan

[22] Filed: Feb. 19, 1976

[21] Appl. No.: 659,586

[30] Foreign Application Priority Data

Aug. 30, 1973 Japan .............................. 48-97718

[52] U.S. Cl. ........................... 235/151.11; 318/571
[51] Int. Cl.² ........................................ G05B 19/18
[58] Field of Search ............... 235/151.11; 318/571

[56] References Cited

UNITED STATES PATENTS 3,798,427 3/1974 Conners ........................ 235/151.11

Primary Examiner—Eugene G. Botz
Attorney, Agent, or Firm—Jay L. Chaskin

[57] ABSTRACT

A feed rate control system for a numerical control system comprising a circuit to produce a unit movement quantity $\Delta S$ and a unit feed rate $\Delta F$, a circuit to accumulate the unit feed rate $\Delta F$ at each pulse of the pulse generator and to store them, a ratio calculator to obtain the ratio M of the output numerical value $\Sigma \Delta F$ to said unit movement quantity $\Delta S$, multipliers $MUL_1$, $MUL_2$, and $MUL_3$ to multiply said unit movement quantity $\Delta S$, a Z-axis increment $\Delta Z$ of said unit movement quantity $\Delta S$ and a X-axis increment $\Delta X$, respectively, by said ratio calculator output M, and a circuit to compare the output numerical value $\Sigma \Delta F$ of the storage circuit with the unit movement quantity $\Delta S$ and to produce an accumulating signal $t$ whenever said $\Sigma \Delta F$ is larger than said $\Delta S$, said accumulating signal controlling $t$ the feed rate of the machine tool, which is provided with a high feed rate circuit.

2 Claims, 8 Drawing Figures

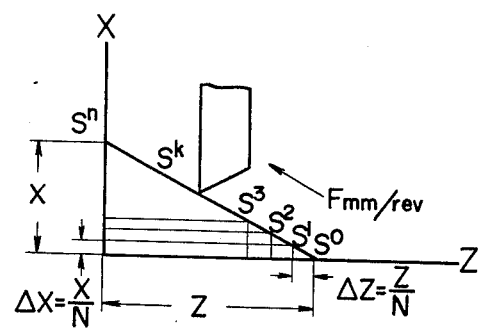
FIG. 1a
FIG. 1b
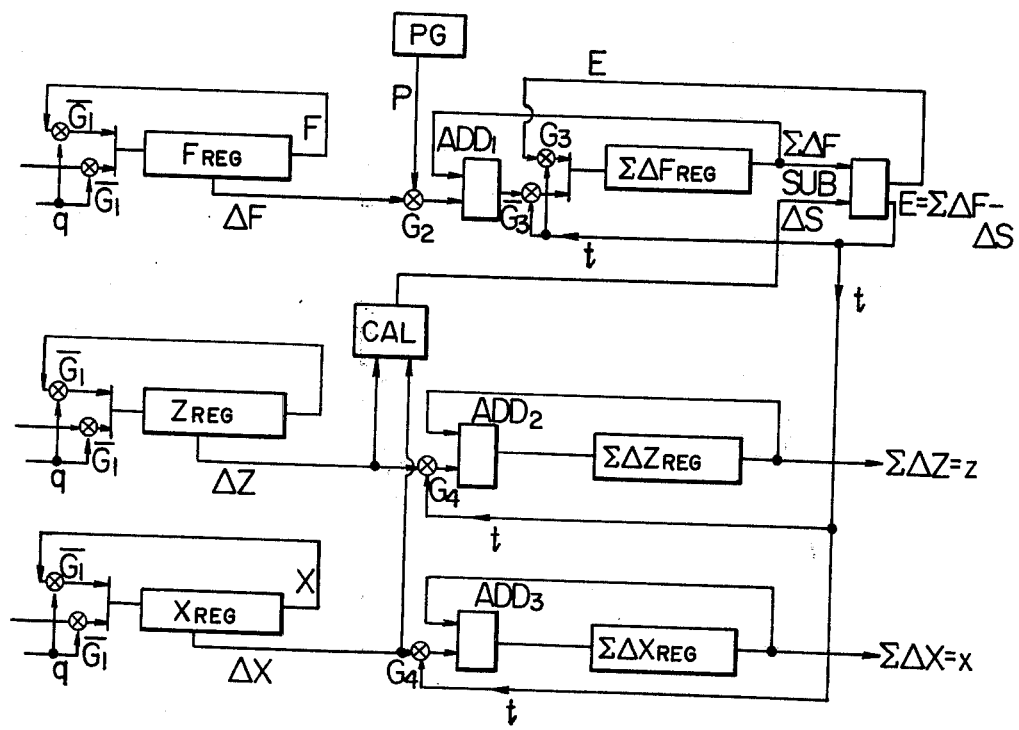
FIG. 2
PRIOR ART

FEED RATE CONTROL SYSTEM FOR NUMERICAL CONTROL MACHINE TOOL

The present invention relates to a feed rate control in numerical control system in which a moving member is fed at a high feed rate with high occuracy of positioning.

A conventional numerical control has a problem with respect to the feed rate of the moving member and the accuracy of positioning. That is, when the positioning is made with a high accuracy, the feed rate is low. This arises from the fact that, in the prior art of feed rate control system, LSD (least significant digit) of interpolator is the same as that of the programmed axis command, and the calculating rate of interpolator has a limit in operating speed, so the feed rate of the moving member is restricted. This feed rate control system has been disclosed in the Japanese Patent Publication No. 9649/1972, filed by the applicant of this patent application. However, a brief description will be given below, for ease of understanding the present invention.

FIG. 1a illustrates a relationship between the feed rate of the tool rest and the amount of movement having two directional components, in the case of the lathe, for example. In the figure, the logitudinal SLIDE of the tool rest is taken along a Z-axis while the transverse SLIDE is taken along a X-axis. FIG. 1a also illustrates a state that the tool rest moves in a straight path from a starting point $S_o$ to an arrival point $S_n$ with a feed rate F (mm/rev) synchronized to the rotation of the main spindle of the machine tool, using a pulse generator (PG) geared to the main spindle. Here, $\Delta Z$ and $\Delta X$ designate a Z-axis and a X-axis of a unit quantity of movement $\Delta S$. N is a value obtained so that the larger of the two increments $\Delta X$ and $\Delta Z$ is selected to be less than or equal to the LSD of the command. In FIG. 1b, $\Delta F$ is a unit feed rate and Q is the number of pulses which PG generates at every revolution of the main spindle.

FIG. 2 is a block schematic diagram of a conventional feed rate control circuit. The unit feed rate $\Delta F$ is accumulated each pulse of PG. An accumulation signal $t$ is generated whenever the former $\Sigma\Delta F$ is larger than the latter $\Delta S$ where $\Sigma\Delta F$ is accumulation of $\Delta F$. The accumulating signal $t$ is used to control the calcuating rate of the interpolator generating the contouring outputs $x (= \Sigma\Delta X)$ and $z (= \Sigma\Delta Z)$.

FIG. 3 shows the variations of the outputs $\Sigma\Delta X$ and $\Sigma\Delta Z$ of interpolator in the feed rate control circuit depicted with a block diagram in FIG. 2. The command value F of the feed rate is selected, for example, in a way that the unit feed rate $\Delta F$ is ¼ of the unit movement quantity $\Delta S$. The Z-axis increment $\Delta Z$ and the X-axis increment $\Delta X$ of the unit movement quantity $\Delta S$ are accumulated, respectively, every time the accumulating signal $t$ is generated.

Figure 4:
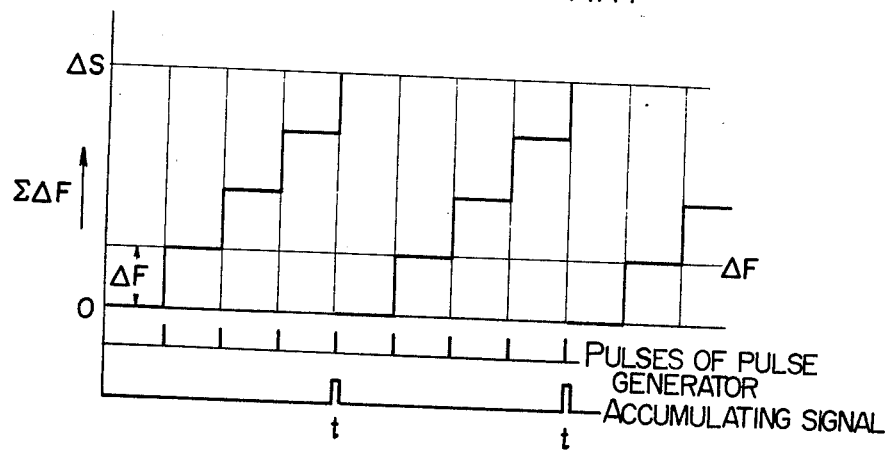

FIG. 4 shows how the unit feed rate $\Delta F$ is accumulated to obtain the outputs of the interpolator shown in FIG. 3. As shown in the figure, the unit feed rate $\Delta F (= \Delta S/4)$ is accumulated in synchronixm with the pulse of PG and the sum resulted therefrom reaches the unit movement quantity $\Delta S$ every four times of the addition to generate the accumulating signal $t$. The feed rate control circuit mentioned above is constructed with the intention of attaining a high accuracy of positioning. For this, it is effective only when the unit feed rate of the tool rest $\Delta F$ is small compared with the unit movement quantity $\Delta S$. This gives a limit to the command value F of the feed rate. That is, in case the command value F is large in this feed rate control circuit, the unit feed rate $\Delta F$ which is given in synchronism with the pulse of the pulse generator is larger than the unit movement quantity. In addition, interpolator effecting the calculation of $E = \Sigma\Delta F - \Delta S$ has a limit in the calculating speed. Accordingly, the control circuit of the prior art is ineffective in processing such unit feed rate $\Delta F$ with the result that the value of E grows to be infinit, thus failing to obtain a desired feed rate.

In the light of the disadvantage mentioned above, the present invention proposes a feed rate control system capable of controlling positioning with a high accuracy, while at the same time capable of automatic acceleration and deceleration control as well as a high feed rate control.

According to one aspect of the present invention, there is provided a feed rate control system for a numerical control having a circuit to product a unit movement quantity $\Delta S$ and a unit feed rate $\Delta F$, a circuit to accumulate the unit feed rate $\Delta F$ each pulse of the PG and to store them, and a circuit to compare the output $\Sigma\Delta F$ of the storage circuit with the unit movement quantity $\Delta S$ and to produce an accumulating signal whenever the former $\Sigma\Delta F$ is larger than the latter $\Delta S$, the accumulating signal controlling the feed rate of the machine tool, which is provided with a high feed rate circuit comprising: a ratio calculator RATIO CAL to obtain the ratio M of said output numerical value $\Sigma\Delta F$ to said unit movement quantity $\Delta S$; and multipliers $MUL_1$, $MUL_2$, and $MUL_3$ to multiply said unit movement quantity $\Delta S$, a Z-axis increment $\Delta Z$ of said unit movement quantity $\Delta S$ and a X-axis increment $\Delta X$, respectively, by said ratio calculator output M, wherein the output $M.\Delta Z$ of said multiplier $MUL_2$ and the output $M.\Delta X$ of said multiplier $MUL_3$ are added to the corresponding contents of the Z-axis drive register $\Sigma M.\Delta Z_{REG}$ and the X-axis drive register $\Sigma M.\Delta X_{REG}$, respectively, in response to the accumulating signal $t$ which is generated when the output E of the subtractor SUB is in the condition $E = \Sigma\Delta F - M.\Delta S \geq O$, the subtractor serving to subtract the output $M.\Delta S$ of said multiplier $MUL_1$ from said output numerical value $\Sigma\Delta F$.

Figure 5:
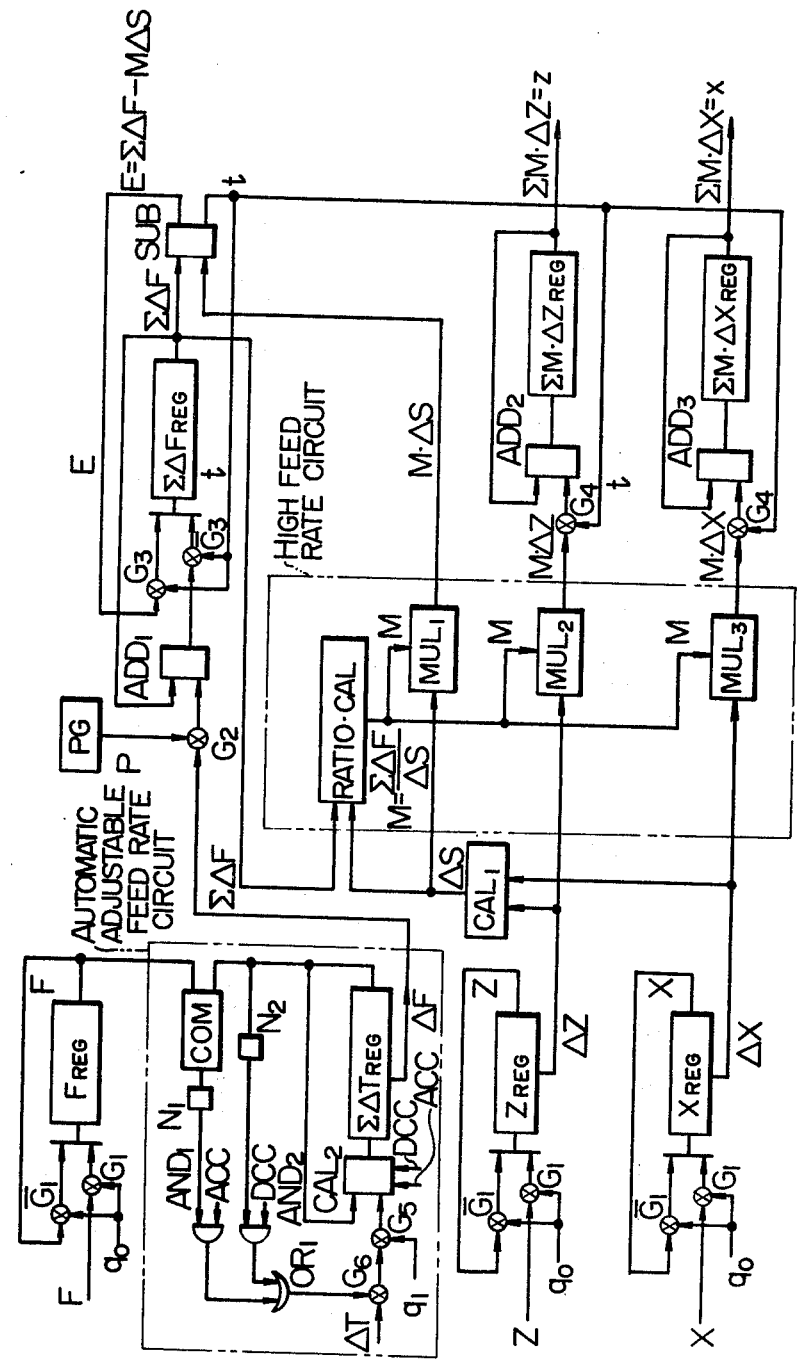
Figure 6:
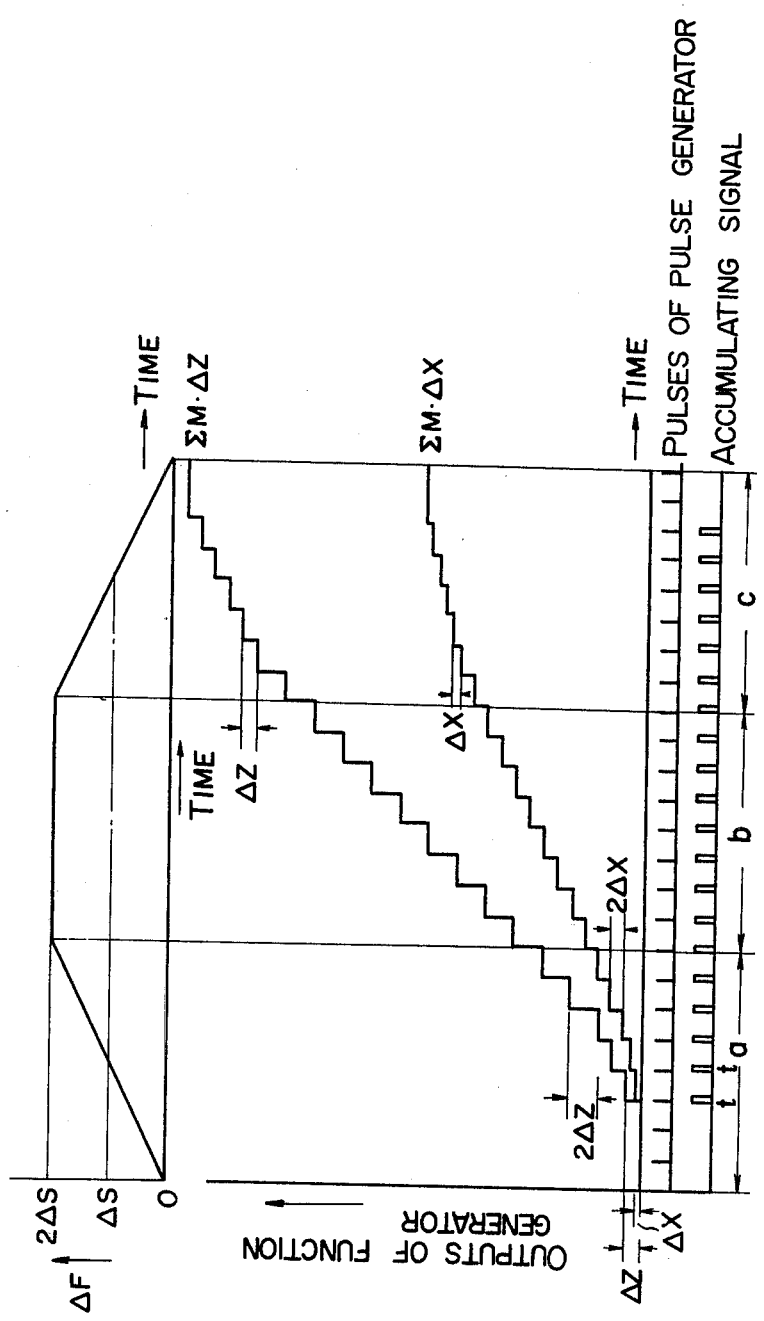
Figure 7:
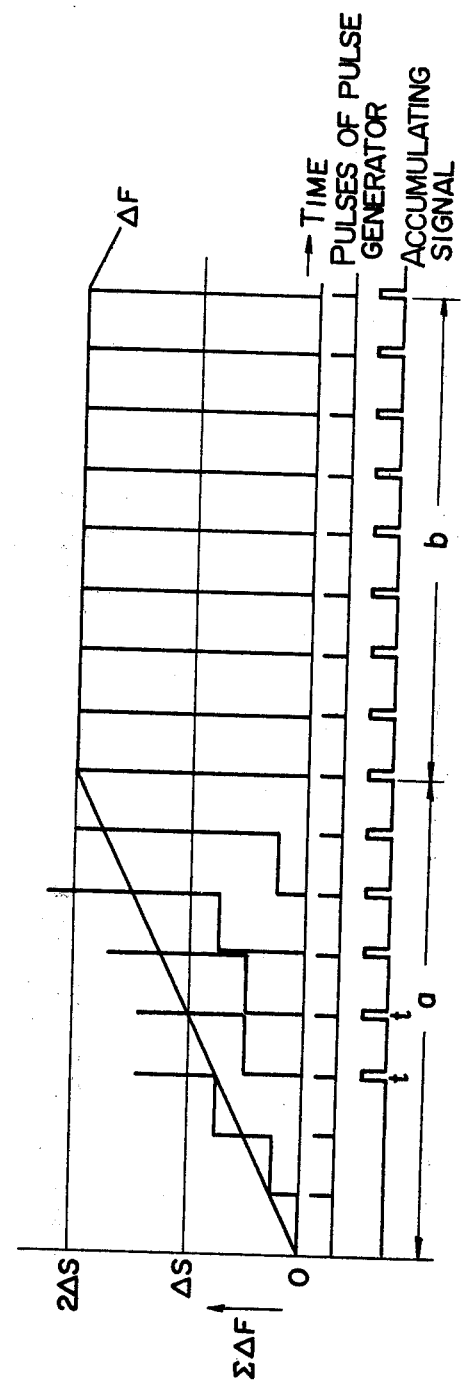

The above and other objects, features and advantages of the present invention will be more clear from the following description with reference to the accompanying drawings, in which:

FIG. 1a is a graph to illustrate a relationship between the command feed rate of tool and the movement quantity possessing two directional components, FIG. 1b illustrates a relationship between the command feed rate of tool and a unit feed rate thereof, FIG. 2 shows a block schematic diagram of a prior art feed rate control circuit, FIG. 3 is a diagrammatical illustration of a variation of the output signals of the interpolator in the feed rate control circuit in FIG. 2, FIG. 4 is a diagrammatical illustration of a state that a unit feed rate is cumulatively added to in order to produce the output signals of the interpolator shown in FIG. 3, FIG. 5 is a block schematic diagram of a feed rate control circuit according to the present invention, FIG. 6 is a diagrammatical illustration of a variation of the output signals of the interpolator in the feed rate control circuit in FIG. 5, and FIG. 7 is a diagramatic illustration of a state where a unit feed rate is cumulatively added in order to obtain the output signals of the interpolator shown in FIG. 5.

Reference is now made to FIG. 5 schematically illustrating an embodiment of a feed rate control system according to the present invention. The two circuitry blocks surrounded with a dot dash line, i.e. an automatic acceleration and deceleration control circuit and a high feed rate control circuit shown in FIG. 5, is essential to the present invention. However, an over all circuit construction of the feed rate control system will first be described, for an aid of better understanding the present invention. In the FIG. 5, $F_{REG}$ designates a register for holding a command numerical value of feed rate F obtained through a gate $G_1$ which is enabled by an external signal $q_o$. The command numerical value of feed rate F derived from the register passes through a gate $\overline{G}_1$ which is disabled by the external signal $q_o$ to return to the input of the register $R_{REG}$, thereby continuing to hold the command numerical value F therein. Here, the characters $G_1$ and $\overline{G}_1$ represent gates which are related in an inversion, and enabled and disabled by an external signal $q_o$. A register $\Sigma\Delta T_{REG}$ holds the result obtained from calculator $CAL_2$, calculation of register $\Sigma\Delta T$ REG's content and a determinate value $\Delta T$ to determine an acceleration and deceleration curve which is fed through a gate $G_5$ which is abled by the application thereto of the external signal $q_1$. The calculator $CAL_2$ functions as an adder when an acceleration command ACC is applied thereto while as a subtractor when it receives a deceleration command DCC. A comparator COM serves to compare the command value F of feed rate and the output value $\Sigma\Delta T$ of the register $\Sigma\Delta T_{REG}$ and produces an output of "LOW" when these compared ones coincides each other. NOT circuits $N_1$ and $N_2$ produce "HIGH" at the respective outputs when "LOW" are the outputs of the comparator COM and the register $\Sigma\Delta T$, respectively. AND circuits $AND_1$ and $AND_2$ receive the inverted outputs of the NOT circuits and the acceleration command ACC and the deceleration command DCC, respectively, as shown in the figure. An OR circuit $OR_1$ receives the outputs of the AND circuits $AND_1$ and $AND_2$. In an adder $ADD_1$, the output numerical value $\Sigma\Delta F$ of a register $\Sigma\Delta F_{REG}$ is added to the output numerical value $\Delta F (= \Sigma\Delta T/Q)$ read from the register $\Sigma\Delta T_{REG}$ through a gate $G_2$ which is enabled by a pulse signal P of a pulse generator PG which is mechanically connected with the main spindle in a manner that Q pulses are generated each one revolution of the main spindle. The register $\Sigma\Delta F_{REG}$ the output of the adder $ADD_1$ through a gate $\overline{G}_3$ which is disabled by an accumulating signal $t$ to be described later. A subtractor SUB effects the subtraction of the output numerical value $\Sigma\Delta F$ of the register $\Sigma\Delta F_{REG}$ and a unit movement quantity $M\cdot\Delta S$ to be described later to obtain a difference E therebetween, i.e. $E = \Sigma\Delta F - M\cdot\Delta S$. The subtractor SUB also, when the calculated difference E is positive or zero, produces the accumulating signal $t$ to enable the gates $G_3$ and $G_4$ while to disable the gate $\overline{G}_3$. The difference E is held in the register $\Sigma\Delta F_{REG}$ through the gate $G_3$ which is enabled when the accumulating signal $t$ is applied thereto. A register $Z_{REG}$ holds a command value Z of the Z-axis component of the tool moved from the start point $S_o$ to the end point $S_n$ shown in FIG. 1, through the gate $G_1$ which is enabled by the application thereto of the external signal $q_o$. The output Z of the register reenters the register itself through the gate $\overline{G}_1$ which is disabled in response to the external signal $q_o$, thereby continuing to hold the command value Z therein.

An adder $ADD_2$ exercises an addition of the output $\Sigma M\cdot\Delta Z$ of a register $\Sigma M\cdot\Delta Z_{REG}$ to the product $M\cdot\Delta Z$ of the output numerical value $\Delta Z$ read out of the register $Z_{REG}$ and the ratio M from a high speed feed rate circuit to be described later, the product $M\cdot\Delta Z$ being delivered to the adder $ADD_2$ from the high feed rate circuit through a gate $G_4$ enabled when the accumulating signal $t$ is applied thereto. The register $\Sigma M\cdot\Delta Z_{REG}$ holds the output numerical value of the adder $ADD_2$, $\Sigma M\cdot\Delta Z = z$, therein, which is a command value to be compared with the detected value of the Z-axial component representing the actual position of tool, and also is delivered to the input of the adder $ADD_2$. Similarly, a register $X_{REG}$ holds a command value X of the X-axis component of the tool movement from the start point $S_o$ to the end point $S_n$ shown in FIG. 1, while the command value X reaches the register $X_{REG}$ through the gate $G_1$ being enabled in response to the impression thereto of the external signal $q_o$. The output numerical value X of the register reenters the register itself through the gate $\overline{G}_1$ being disabled by the application thereto of the external signal $q_o$, thereby continuing to hold the command value X therein.

An adder $ADD_3$ exercises an addition of the output $\Sigma M\cdot\Delta X$ of a register $\Sigma M\cdot\Delta X_{REG}$ to the product $M\cdot\Delta X$ of the output numerical value $\Delta X$ read out of the register $X_{REG}$ and the ratio M to be described later, while the product $M\cdot\Delta X$ is delivered to the adder $ADD_3$ through the gate $G_4$ enabled when the accumulating signal $t$ is applied thereto. The register $\Sigma M\cdot\Delta X_{REG}$ holds the output numerical value of the adder $ADD_3$, $\Sigma M\cdot\Delta X = x$, therein, which is a command value to be compared with the detected value of the X-axial component representing the actual position of the tool rest, and also is applied to the input of the adder $ADD_3$. A calculator $CAL_1$ receives the numerical values $\Delta Z$ and $\Delta X$ read out of the respective corresponding registers $Z_{REG}$ and $X_{REG}$ and calculates these values to produce a unit movement quantity $\Delta S$. The output numerical value $\Delta S$ is multiplied by the ratio M to be described later to obtain the product $M\cdot\Delta S$. The product $M\cdot\Delta S$ is transferred to the subtractor SUB and is operated together with the feed rate $\Sigma\Delta F$ to produce the difference E therebetween, as previously described. In this specification, the circuitry to obtain the command numerical values $\Sigma M\cdot\Delta Z = z$ and $\Sigma M\cdot\Delta X = x$ will be referred to as a interpolator. A ratio calculator RATIO.CAL operates to obtain the ratio of the feed rate $\Sigma\Delta F$ to the unit movement quantity $\Delta S$, $M = (\Sigma\Delta F/\Delta S)$. The ratio M is then transferred to the respective multipliers $MUL_1$, $MUL_2$, and $MUL_3$, and is multiplied therein by the respective corresponding output values, $\Delta S$, $\Delta Z$, and $\Delta X$. Further, the ratio M is selected in a way that, when $\Delta F < \Delta S$, $M = 1$, and when $\Delta F \geq \Delta S$, $M = (\Sigma\Delta F/\Delta S)$ ($M$ should be an integer for easy operation obtained by neglecting fractional part).

An operation of the feed rate control system above mentioned will next be described. Since the circuitry except the two circuitries mentioned above and surrounded with a dot-dash-line is the same as the circuitry disclosed in the Patent Publication previously mentioned filed by the applicant of this patent application, the operation thereof will not described. The automatic acceleration and deceleration control circuit which is one of features of the present invention, will first be described with respect to the operation thereof. In the case of acceleration, the calculator $CAL_2$ is made to operate as an adder by the application thereto of the acceleration command ACC, and operates to add $\Delta T$ which is a determinant of the inclination of acceleration to the content in the register $\Sigma \Delta T_{REG}$ whose initial value is zero, in response to the arrival of each clock pulse $q_1$. The result of the addition $\Sigma \Delta T$ is then compared in the comparator COM with the command value F of feed rate. When these coincide with each other, the comparator COM produces "LOW" at its output which in turn is inverted by the inverter $N_1$ into "HIGH". The output HIGH of the inverter passes through the AND gate $AND_1$ receiving the acceleration command ACC and the OR gate $OR_1$ to disable the gate $G_6$ thereby to stop the addition of the determinant $\Delta T$. In the case of deceleration, the calculator $CAL_2$ is made to operate as a subtractor by the application thereto of the deceleration command DCC, and operates to subtract the determinant $\Delta T$ from the content $\Sigma \Delta T$ in the register $\Sigma \Delta T_{REG}$ on each arrival of the clock pulse $q_1$, as inverse to the case of acceleration. As a result of the sequencial subtraction, the content $\Sigma \Delta T$ is 0, which is then inverted by the inverter $N_2$ into HIGH. The output HIGH passes through the AND gate $AND_2$ receiving the deceleration command DCC and the OR gate $OR_1$ to disable the gate $G_6$ thereby to stop the deceleration of $\Delta T$. The quotient $\Delta F (= (\Sigma \Delta T/Q))$ of the division of the content $\Sigma \Delta T$ of the register $\Sigma \Delta T_{REG}$ by the number of pulses Q for each revolution of the main spindle of the pulse generator PG, is derived from the register $\Sigma \Delta T_{REG}$. The quotient $\Delta F$ is fed, in synchronism with the pulses of the pulse generator PG, to the register $\Sigma \Delta F_{REG}$ through the adder $ADD_1$.

A next description will be made about the operation of the high feed rate control circuit. When the command value F of the feed rate is small, the quotient $\Delta F$ taken out of the automatic acceleration and deceleration control circuit is smaller than the unit movement quantity $\Delta S$ over the entire range of the feed rate to be controlled, i.e. the entire range of the feed rate of acceleration and deceleration. As previously described, in this case, the operation of the equation $E = \Sigma \Delta F - \Delta S$ is permitted. On the other hand, when the command value of the feed rate F is large, the quotient $\Delta F$ is larger than $\Delta S$. The interpolator effecting the operation of $E = \Sigma \Delta F - \Delta S$ has a limit in the operating speed. Thus, the feed rate control circuit is ineffective to process the $\Delta F$ so that the difference E grows to be an infinite, thus failing to obtain a desired feed rate, as previously described. However, in the present invention, the content $\Sigma \Delta F$ in the register $\Sigma \Delta F_{REG}$ shortly after the quotient $\Delta F$ coming, in synchronism with the pulse of the guplse generator PG, thereinto is compared in the ratio calculator RATIO CAL with the unit movement quantity $\Delta S$ to obtain the ratio M. In the ratio calculator RATIO CAL, 1 the state $M = 1$ under the condition $\Delta F < \Delta S$ corresponds to that in the Patent Publication No. 9649/1972, mentioned above.

2 On the other hand the state $M = (\Sigma \Delta F / \Delta S)$ (M should be an integer obtained by neglecting fractional part) under the condition $\Delta F \geq \Delta S$, satisfies the requirement of a high feed rate control, and, in this case, the product $M \cdot \Delta S$ multiplied the unit movement quantity $\Delta S$ by the ratio M is obtained through the multiplier $MUL_1$ and then the product $M \cdot \Delta S$ is fed to the subtractor SUM where the subtraction $E = \Sigma \Delta F - M \cdot \Delta S$ is effected. The result of the subtraction E is entered into the register $\Sigma \Delta F_{REG}$ through the gate $G_3$ enabled by the accumulating signal $t$ immediately after the subtraction. The difference E in turn is added in the adder $ADD_1$ to the unit feed rate $\Delta F$ coming thereinto through the gate $G_2$ enabled in synchronism with the pulse generator, and the result of the addition is entered through the gate $\overline{G}_3$ into the register $\Sigma \Delta F_{REG}$. The result of the addition is the subsequent content $\Sigma \Delta F$ of the register $\Sigma \Delta F_{REG}$. The content $\Sigma \Delta F$ is calculated in the ratio calculator RATIO CAL to obtain the ratio thereof to the unit movement quantity $\Delta S$, and a similar process will be repeated successively. In the high feed rate control circuit, the output M of the RATIO CAL is applied to the respective multipliers $MUL_2$ and $MUL_3$ whose corresponding outputs $M \cdot \Delta Z$ and $M \cdot \Delta X$ are applied through the gates $G_4$ enabled by the accumulating signal $t$ of the subtractor SUB to the respective corresponding adders $ADD_2$ and $ADD_3$. The outputs $M \cdot \Delta X$ of the multipliers applied to the adders are added therein to the respective corresponding contents of the Z-axis register $\Sigma M \cdot \Delta Z_{REG}$ and the X-axis registor $\Sigma M \cdot \Delta X_{REG}$ and the results from the addition $\Sigma M \cdot \Delta Z = z$ and $\Sigma M \cdot \Delta X = x$ appearing at the respective registors are used as the Z-axis and the X-axis outputs of the interpolator.

FIG. 6 shows an example of the feed rate command F accompanying the automatic acceleration and deceleration control in a manner that the unit feed rate $\Delta F$ is increased twice the unit movement quantity $\Delta S$, then is kept constant for a time, and finally is gradually decreased to zero. As can be seen from the figure, the accumulating signal $t$ for causing the interpolator to produce the output, occurs once every three pulses of the pulse generator and, at this time, the moving increment is $\Delta Z$ for Z-axis while $\Delta X$ is for X-axis. Following this, the accumulating signal $t$ occurs once each pulse of the pulse generator PG with increase of the interpolator output. At a point of the increase thereof, the Z-axis moving increment takes a change to $2 \cdot \Delta Z$ in response to the acceleration command, the X-axis moving increment to $2 \cdot \Delta X$.

After this, the interpolator generator generator outputs continues to increase at a constant rate, and, at a point of the increase thereof, the z-axis moving increment returns to $\Delta Z$ while the x-axis moving increment to $\Delta X$, in response to the deceleration command DCC. This deceleration state of the interpolator is controled to make the contouring path to final position. In this example having described heretofore, the command value F of the feed rate is used whose unit feed rate $\Delta F$ is twice the unit movement quantity $\Delta S$. Note, however, that, in the present invention, the use of the ratio calculator in the high feed rate circuit would permit the use of a larger command value within the servo system capability to follow.

Referring now to FIG. 7, $\Sigma \Delta F$ exceeds the unit movement quantity $\Delta S$ at the third pulse of the pulse generator PG to generate the accumulating signal $t$, as described with reference to FIG. 6. At this time, the ratio M exists in the region of $\Delta F < \Delta S$, so that $M = 1$. From the fourth pulse, the ratio M enters into the region of $\Delta F \geq \Delta S$ so that $M = 1$ is derived from the relation of $M = (\Sigma \Delta F/\Delta S)$ (M is an integer obtained from neglecting fractional part). From the sixth pulse of the pulse generator, $\Sigma \Delta F$ exceeds $2 \cdot \Delta S$, and the ratio calculator output M is 2 depending upon the relation $M = (\Sigma \Delta F/\Delta S)$. Following this, the feed rate F continues with the condition of $M = 2$ for a constant feed rate with the deceleration command, into the region of deceleration with $M = 1$ (not shown in this figure). Although, in the example of this figure, the maximum of M is 2, i.e. $M = 2$, if the command value F of the feed rate is set large, a larger ratio M is permitted in use, as far as the servo system may operate normally to follow.

As apparent from the foregoing description, the feed rate control system of the present invention is constructed by adding, the automatic feed rate control circuitry and the high feed rate circuitry, to the conventional feed rate control system. As a result, when the command value F of the feed rate is small, the feed rate control system according to the present invention enables high accuracy positioning, and when the command value F is large, high accuracy positioning is also possible. That is, in such a case, the automatic feed rate control circuitry effects the acceleration and when the feed rate reaches the command value F, it stops its accelerating operation and a machine slide is controled at a constant feed rate. When the tool approaches the destination after moving at a constant feed rate, it is decelerated and when the unit feed rate $\Delta F$ is sufficiently smaller than the unit movement quantity $\Delta S$, the positioning is completed. Thus, even when the command value F is large, the high feed rate control and the automatic acceleration and deceleration control is enabled. Thus, the effects attained by the present invention are that a high accuracy of positioning is attained and at the same time the time for positioning is shortened. Finally, it is to be noted that the block diagram of the control circuit in FIG. 5 is operable in a high feed rate control, without the automatic acceleration and deceleration control circuitry, if necessary.

What we claim is:

1. A feed rate control system for a numerical control system having a circuit to produce a unit movement quantity $\Delta S$ and a unit feed rate $\Delta F$, a circuit to accumulate the unit feed rate $\Delta F$ at each pulse of the pulse generator and to store them, and a circuit to compare the output numerical value $\Sigma \Delta F$ of the storage circuit with the unit movement quantity $\Delta S$ and to produce an accumulating signal $t$ whenever said $\Sigma \Delta F$ is larger than said $\Delta S$, said accumulating signal controlling $t$ the feed rate of the machine tool, which is provided with a high feed rate circuit comprising: a ratio calculator RATIO CAL to obtain the ratio M of said output numerical value $\Sigma \Delta F$ to said unit mivement quantity $\Delta S$; and multipliers $MUL_1$, $MUL_2$, and $MUL_3$ to multiply said unit movement quantity $\Delta S$, a Z-axis increment $\Delta Z$ of said unit movement quantity $\Delta S$ and a X-axis increment $\Delta X$, respectively, by said ratio calculator output M, wherein the output $M \cdot \Delta Z$ of said multiplier $MUL_2$ and the output $M \cdot \Delta X$ of said multiplier $MUL_3$ are added to the corresponding contents of a Z-axis drive register $\Sigma M \Delta Z_{REG}$ and a X-axis drive register $\Sigma M \cdot \Delta X_{REG}$ register, respectively, in response to the accumulating signal $t$ which is generated when the output E of a subtractor SUB is in the condition $E = \Sigma \Delta F - M \cdot \Delta X \geq O$, the subtractor serving to subtract the output $M \cdot \Delta S$ of said multiplier $MUL_1$ from said output numerical value $\Sigma \Delta F$.

2. A feed rate control system for a numerical control system claimed in claim 1, which is further provided with an automatic acceleration and deceleration circuit including a register $\Sigma \Delta T_{REG}$ capable of increasing said unit feed rate $\Delta F$ to the feed rate command value F by an arbitrary amount of value $\Delta T$ at each clock pulse in response to an acceleration command ACC and also decreasing said unit feed rate $\Delta F$ by an arbitrary amount of value $\Delta T$ at each clock pulse in response to a deceleration command DCC, wherein said unit feed rate $\Delta F$ is calculated from said register $\Sigma \Delta T_{REG}$ thereby enabling a high feed rate control and an automatic acceleration and deceleration control.

* * * * *